United States Patent
Fisher et al.

(10) Patent No.: US 6,416,706 B1
(45) Date of Patent: Jul. 9, 2002

(54) MOLDING APPARATUS AND METHOD USING A ROBOT TO INTRODUCE AND INSERT INTO A MOLD

(75) Inventors: Trent P. Fisher, Yellow Springs; John M. Westbeld, Kettering, both of OH (US)

(73) Assignee: SAS Automation Ltd., Xenia, OH (US)

( * ) Notice: Subject to any disclaimer, the term of this patent is extended or adjusted under 35 U.S.C. 154(b) by 0 days.

(21) Appl. No.: 09/504,521

(22) Filed: Feb. 15, 2000

(51) Int. Cl.⁷ .......................... B29C 33/14; B29C 49/24
(52) U.S. Cl. ...................... 264/484; 264/275; 264/509; 425/126.1; 425/174.8 E; 425/504; 425/522
(58) Field of Search ............................ 425/216.1, 522, 425/174.8 E, 503, 504; 264/484, 509, 275

(56) References Cited

U.S. PATENT DOCUMENTS

| | | | |
|---|---|---|---|
| 3,504,063 A | * 3/1970 | Lemelson | |
| 3,602,496 A | * 8/1971 | Langenohl et al. | |
| 3,837,772 A | 9/1974 | Van de Walker et al. | 425/126.1 |
| 4,236,954 A | * 12/1980 | Edwards | 425/174.8 E |
| 4,479,644 A | * 10/1984 | Bartimes et al. | 425/503 |
| 4,603,329 A | 7/1986 | Bangerter et al. | 425/137 |
| 4,755,333 A | 7/1988 | Gray | 425/217 |
| 4,784,421 A | 11/1988 | Alvite' | 29/568 |
| 4,784,592 A | * 11/1988 | Dromigny | 425/126.1 |
| 4,987,332 A | * 1/1991 | Yamamoto et al. | 425/504 |
| 5,326,523 A | 7/1994 | Güstävel et al. | 264/257 |
| 5,527,173 A | 6/1996 | Miller et al. | 425/126.1 |
| 5,582,845 A | 12/1996 | Schad et al. | 425/126.1 |
| 5,645,865 A | 7/1997 | Schad et al. | 425/126.1 |
| 5,711,647 A | 1/1998 | Slocum | 414/749 |
| 5,833,902 A | 11/1998 | Coxhead et al. | 425/183 |
| 6,007,759 A | * 12/1999 | Ten Tije et al. | 425/174.8 E |

FOREIGN PATENT DOCUMENTS

| | | | |
|---|---|---|---|
| GB | | 1128662 A | * 10/1968 |
| WO | WO 96/34730 A1 | | * 11/1996 |

* cited by examiner

*Primary Examiner*—Robert Davis
(74) *Attorney, Agent, or Firm*—MacMillan, Sobanski & Todd, LLC

(57) ABSTRACT

Apparatus for molding articles from moldable material in a mold includes end of arm tooling for an articulated robot arm associated with the mold, where the end of arm tooling includes an insert transfer member mounted on the end of the articulated robot arm. The insert transfer member has an insert holder for gripping the insert. The apparatus also includes a charger for generating an electric field that causes the insert to adhere onto a surface of the mold.

20 Claims, 9 Drawing Sheets

MOLDING APPARATUS AND METHOD USING A ROBOT TO INTRODUCE AND INSERT INTO A MOLD

TECHNICAL FIELD

This invention relates to tooling appropriate for use at the end of a robot arm used in a molding process. More particularly, this invention relates to using a robot to introduce an insert into a mold so that the insert can be integrated into the molded article.

BACKGROUND OF THE INVENTION

Molding processes, such as an injection molding process, are commonly used for molding articles from moldable plastic material. The apparatus used to carry out the molding process generally comprises two mold surfaces—a core mold half and a cavity mold half The mold halves are brought together and charged with a moldable material. After applying heat and pressure to mold the article, the mold halves are separated for removal of the completed article. Robots are often used in molding operations to remove the molded articles after the product is molded. The robot typically uses either a grasping technique or a suction apparatus to remove the molded article.

Often it is desirable to place a foreign substance, i.e., a material different from the moldable material, into the mold so that the foreign substance can be molded into the article during the molding process. These foreign substances, referred to as molding inserts, become part of the final molded product. Alternatively, a detail of the insert is left on the plastic part. The insert can be metallic as well as cloth or plastic, and can be in the form of a threaded core, a retaining ring, or a film. The insert can be, for example, a threaded metal sleeve to become molded into the neck of a molded plastic bottle. Another example of an insert is a label containing such information as product identification, operating instructions, bar codes, safety information such as warning labels, and decorations, with the label being integrally molded into the surface of the molded article. Applying labels as inserts to molded articles is particularly advantageous because of the toughness of the bond between the label and the molded article. Frequently, these inserts are placed by hand into the mold between cycles. It would be advantageous if an automated system could be developed.

Miller in U.S. Pat. No. 5,527,173 discloses an injection molding system that includes a carrier plate or rack 20 for receiving completed articles. The rack is positionable between the cavity and core mold halves after the mold cycle. Schad et al. in U.S. Pat. No. 5,582,845 discloses an injection molding system where a robot uses a vacuum system to grasp mold inserts for insertion into molds. The robot also removes the molded articles (preforms) from the molds. A positive air pressure system assists in removal of the molded articles from the robot at the appropriate time.

SUMMARY OF THE INVENTION

The above objects as well as other objects not specifically enumerated are achieved by apparatus for molding articles from moldable material in a mold comprising end of arm tooling for an articulated robot arm associated with the mold, where the end of arm tooling includes an insert transfer member mounted on the end of the articulated robot arm. The insert transfer member has an insert holder for gripping the insert. The apparatus also includes a charger for generating an electric field that causes the insert to adhere onto a surface of the mold.

According to the present invention, there is also provided apparatus for molding articles from moldable material in a mold comprising end of arm tooling for an articulated robot arm associated with the mold. The end of arm tooling includes an insert transfer member mounted on the end of the articulated robot arm. The insert transfer member has a vacuum-assisted insert holder supplied with a source of vacuum for gripping the insert. The apparatus also includes a charger for generating an electric field that causes the insert to adhere onto a surface of the mold. The charger includes a wand that is positioned outside the mold.

In a particular embodiment of the invention the insert holder includes suction cups for applying a vacuum to the insert, and the apparatus further includes an article removal assembly mounted on the end of arm tooling for removing molded articles from the mold.

According to this invention there is also provided a method of molding articles from moldable material comprising opening a mold having a mold cavity, and introducing end of arm tooling on a robot arm into the mold cavity, where the end of arm tooling is gripping an insert. An electric field that causes the insert to adhere onto a surface of the mold is generated. The end of arm tooling is removed from the mold;. The mold is charged and closed for molding. The end of arm tooling comprises an insert transfer member mounted on the end of the articulated robot arm. The insert transfer member has an insert holder for gripping the insert.

In a particular embodiment of the invention, the insert holder positions the insert in contact with the surface of the mold prior to the step of generating the electric field.

In another specific embodiment of the invention, the step of generating the electric field occurs prior to the introduction of the insert into the mold. The insert holder and insert are moved through the electric field to charge the insert prior to the introduction of the insert into the mold. The end of arm tooling grips the insert with a vacuum during the step of introducing the insert into the mold. The insert holder then positions the insert in contact with the surface of the mold. Then the vacuum is removed, thereby releasing the grip of the insert holder on the insert.

Various objects and advantages of this invention will become apparent to those skilled in the art from the following detailed description of the preferred embodiment, when read in light of the accompanying drawings.

DETAILED DESCRIPTION OF THE INVENTION

Figure 1:
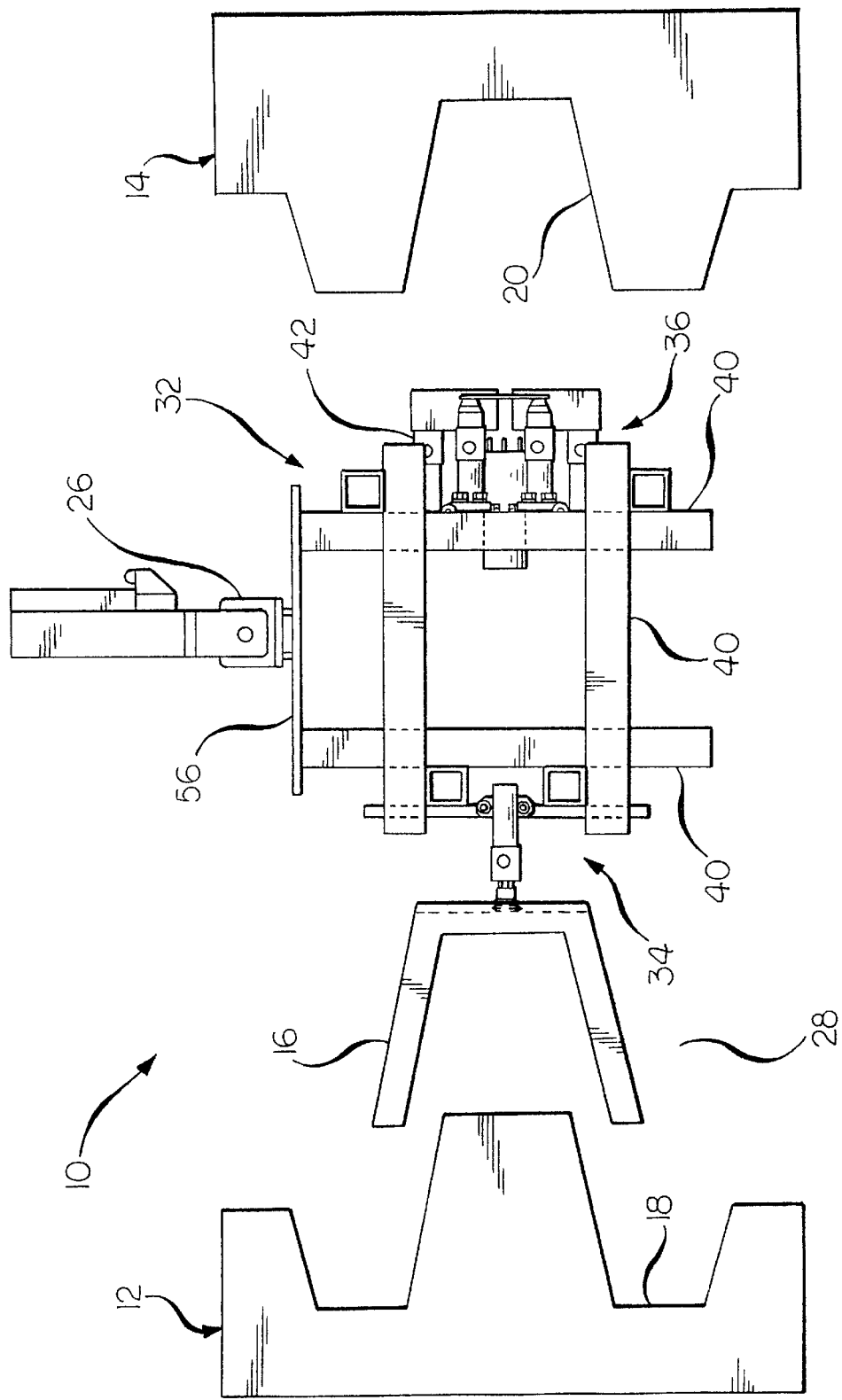
FIG. 1 is a plan view of an injection mold and a robot for inserting a film into the mold and for removing the molded article from the mold, with the robot including an end of arm tool according to the invention.

As shown in FIG. 1, the an injection mold, indicated generally at 10, has a core half 12 and a cavity half 14. The operation of the mold 10 generally includes a closing of the mold by moving the core half 12 and the cavity half 14 together, charging the mold 10 with a charge of moldable material, not shown, and molding the material under heat and pressure to form the molded article, indicated at 16. The inside surface 18 of the core half 12 and the inside surface 20 of the cavity half 14 have similarly shaped, but complementary contours, and, when the mold is closed, the core half and cavity half are spaced apart only by the mold space, which is the shape of the molded article 16. After the molding step, the core half and cavity half are separated, as shown in FIG. 1, and the molded article 16 is removed. Molding operations such as injection molding, blow molding, and numerous other molding processes can be used with the invention. The mold halves 12, 14 are preferably made of steel, and can be provided with heating and/or cooling passages as desired to control the temperature of the mold and molding process.

A robot mounting chuck 26 is mounted at the end of a robot, and extends into the space 28 between the two mold halves 12, 14. It is to be understood that for purposes of the invention the term "robot" includes a side entry pick and place unit that is either automatically or manually controlled, as well as other automatically or manually remotely controlled extension members. The robot mounting chuck 26 is preferably configured so that it can be articulated through three dimensions of space, i.e., on x, y and z axes, and can be rotated, so that the apparatus mounted on the mounting chuck 26 can be oriented and positioned wherever desired. Robots suitable for use with the invention are well known in the art, and numerous types of robots can be used with the invention. One of the advantages of the invention, as will be explained in further detail below, is that it can be retrofitted into already established molding processes by placing the end of arm tooling of the invention on the robot mounting chucks of existing robots associated with existing molding processes. No extensive reconfiguration of the existing equipment is required.

Positioned on the robot mounting chuck 26 is the end of arm tooling 32, which is comprised of an article removal assembly 34 and an insert transfer assembly 36. Since the end of arm tooling 32 is mounted on the robot mounting chuck 26, it can be positioned wherever desired by the robot. The end of arm tooling 32 includes a framework 40 on which are mounted two insert transfer members 42. Therefore, the insert transfer members 42 are indirectly mounted on the mounting chuck 26. Although two insert transfer members are shown, any number (one or more) of insert transfer members can be used. The end of arm tooling 32 is preferably provided with locator pins, not shown, that precisely locate a reference on the mold, such as on mold cavity half 14, so that a true alignment of the insert and the mold 10 can be achieved.

Figure 2:
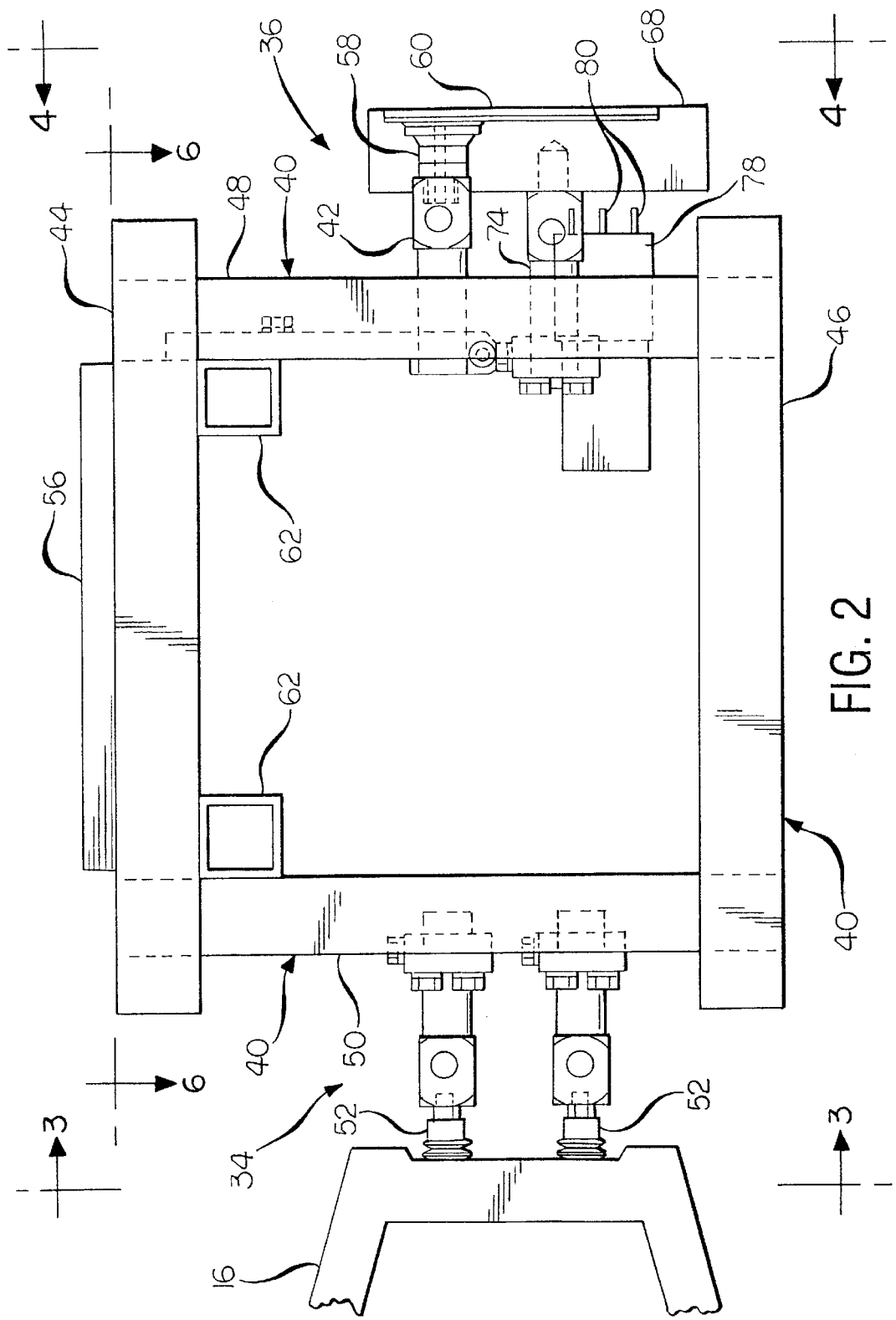
FIG. 2 is a schematic front elevational view of the end of arm tool shown in FIG. 1.
Figure 3:
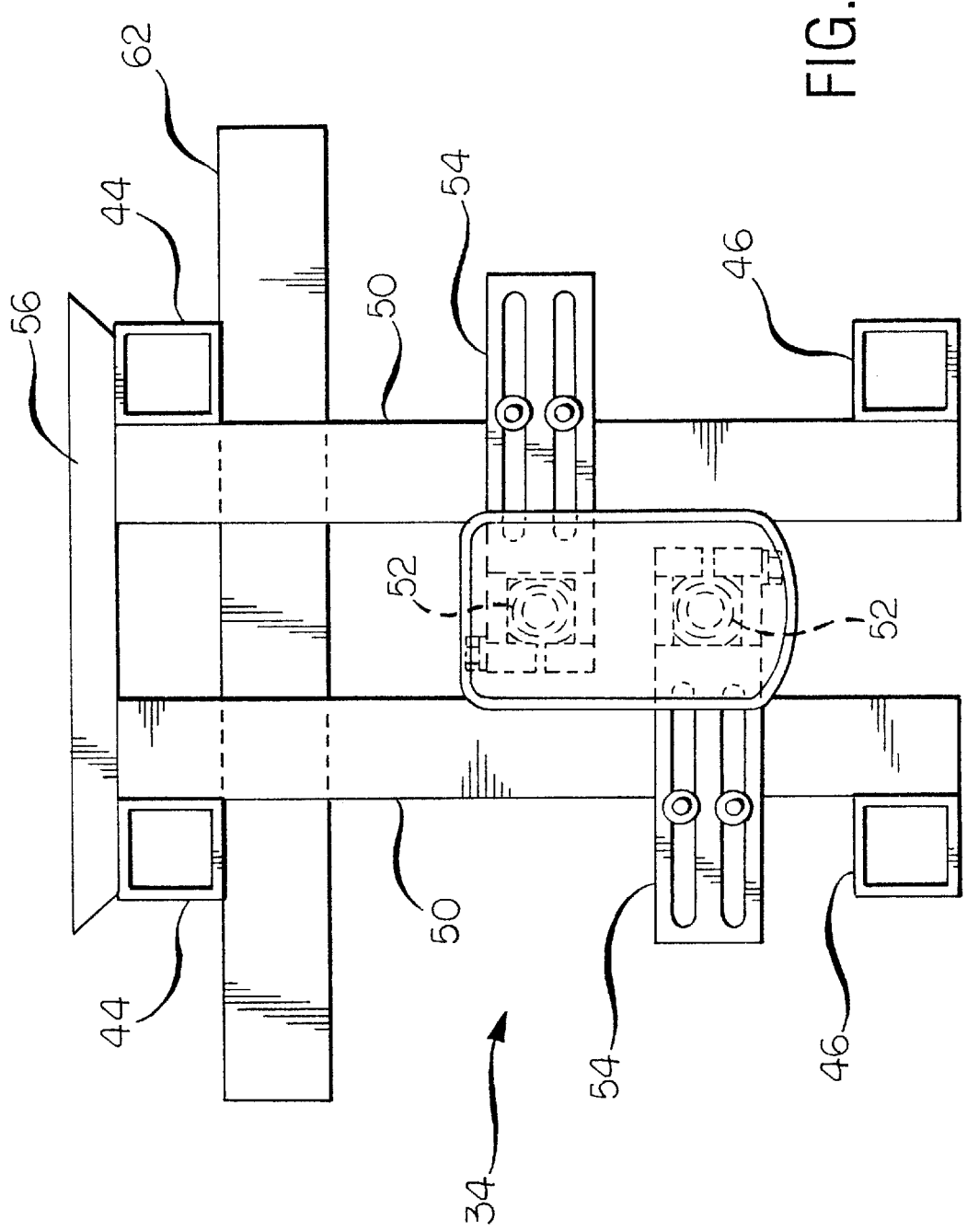
FIG. 3 is a schematic left side elevational view of an end of arm tool of FIG. 2, taken along line 3—3, showing the article removal assembly, with the article removed for clarity.
Figure 4:
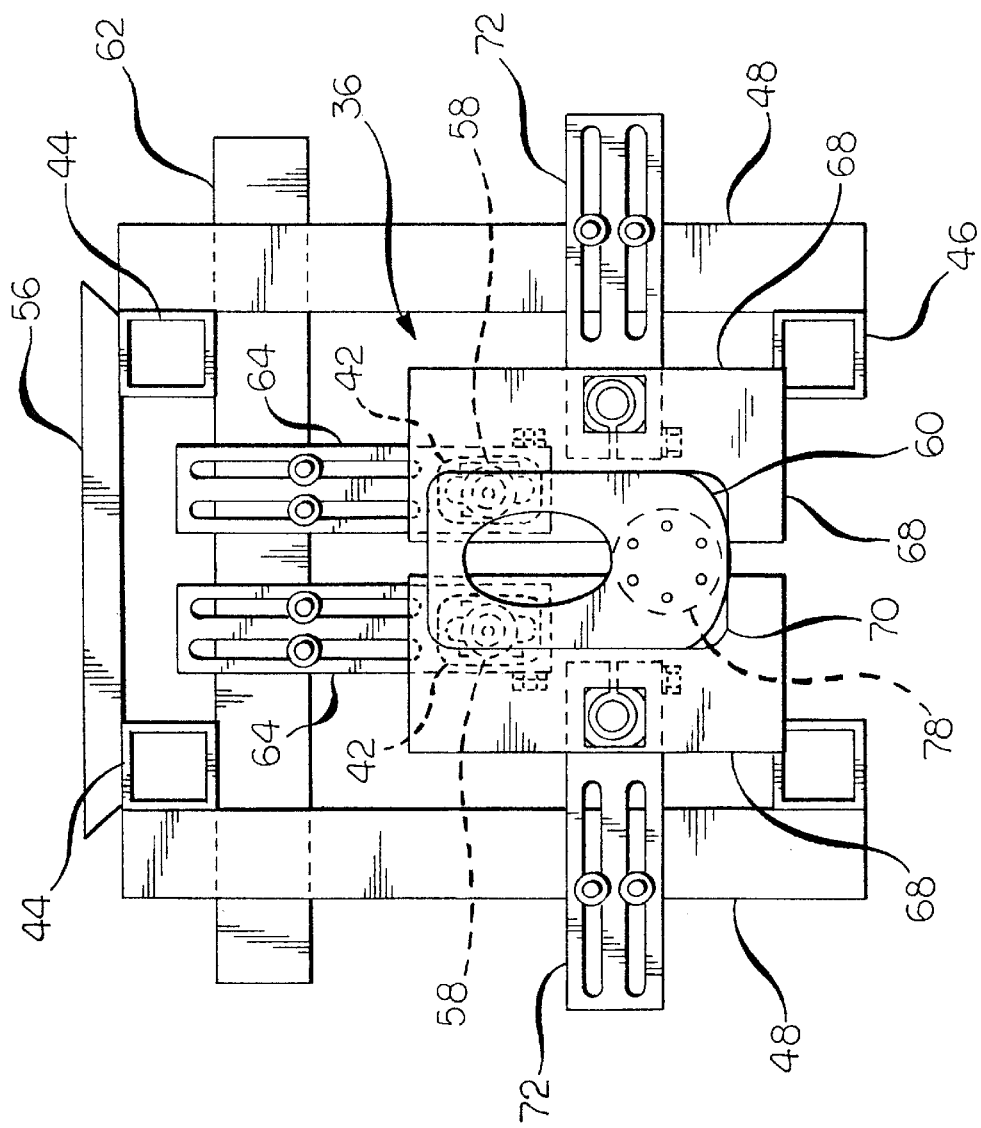
FIG. 4 is a schematic right side elevational view of the end of arm tool of FIG. 2, taken along line 4—4, showing the insert transfer assembly.
Figure 6:
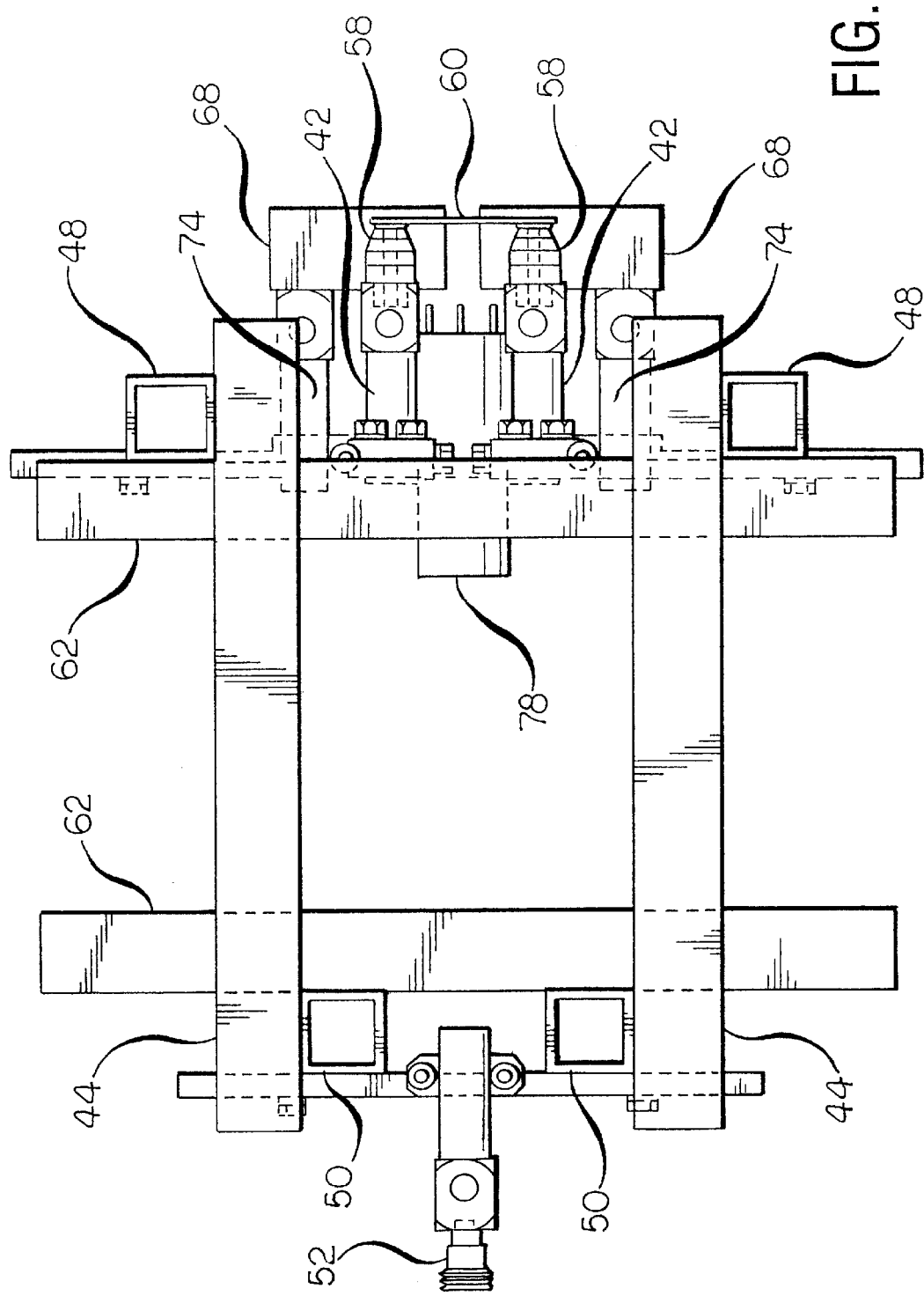
FIG. 6 is a schematic plan view of the top of the end of arm tool of FIG. 2, taken along line 6—6.

As shown in FIG. 2 the framework 40 includes upper and lower crossbars 44, 46, insert vertical bars 48 and removal vertical bars 50. As shown in FIGS. 2, 3 and 6, the article removing assembly 34 includes a pair of vacuum cups 52 mounted on the removal vertical bars 50. The vacuum cups are connected to a source of vacuum by means of a vacuum air line, not shown, and when a vacuum is applied to the vacuum cups 52 the article 16 can be grasped and held for removal from the mold. It can be seen that the vacuum cups 52 can be adjusted in their position with respect to the framework 40 by adjusting the brackets 54 used to mount the vacuum cups 52 to the removal vertical bars 50. A mounting plate 56, also shown in FIGS. 1, 3 and 4, is used to connect the end of arm tooling 32 to the robot mounting chuck 26. For purposes of clarity, the mounting plate 56 has been removed from FIG. 6.

Figure 5:
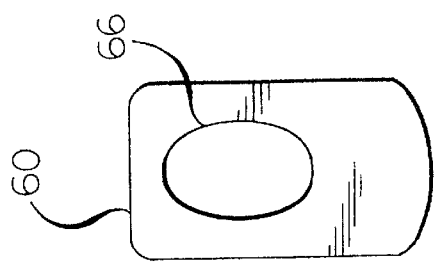
FIG. 5 is a plan view of the insert illustrated in FIGS. 2 and 4.

As shown in FIGS. 2, 4 and 6, the insert transfer assembly 36 includes insert transfer members 42 that have insert holders, such as vacuum cups 58, for holding an insert 60. The insert transfer members 42 are mounted on the framework 40, and specifically on the longitudinal frame 62, using brackets 64. It can be seen that the insert transfer members 42 and the vacuum cups 58 are configured to be adjustable in position with respect to the framework. The insert 60 is shown more clearly in FIG. 5, and is provided with a cutout portion 66.

The insert holders used in the invention can be any member suitable for holding or griping the insert so that the insert can be picked up and properly placed in the mold. The insert transfer members 42 can be any element suitable for holding and mounting the insert holders. Other examples of an insert holders besides vacuum cups could be used with the invention. For example, an insert holder with one or more mechanical pinching devices for physically gripping the insert could be used. A static electricity device, which holds the insert, could also be used as the insert holder. The insert holder could also be made with one or more pins that would be inserted into the insert, such as a fabric insert, for gripping the insert. Another insert holder that could be used with the invention is a pin device where the insert is a fabric, and a cohesive system that uses cohesive forces to grip the insert. The cohesive system could be a wet system or a dry system.

The vacuum cups 58 are connected to a source of vacuum, not shown, for gripping the insert 60. Although the insert transfer assembly 36 shown includes two vacuum cups 58, it is to be understood that any number of insert vacuum cups 58, including a single vacuum cup, could be used with the invention. It is to be understood that the term "vacuum" means any pressure less than one atmosphere. The amount of vacuum used to grip the insert can be any vacuum pressure appropriate to carry the weight of the insert and appropriate for the surface texture of the insert, and is typically within the range of from about 0.3 to about 0.7 atmosphere. Mounted in juxtaposition with the insert transfer members 42 and the vacuum cups 58 is an optional guide block 68, which is preferably made of a non-conductive material such as a plastic material. The guide block 68 has a milled out or recessed portion 70 in its face for accurate alignment of the insert 60 with respect to the insert transfer members 42 and the entire end of arm tooling 32. The guide block 68 can also be used to press or squeeze the insert 60 against the inside surface 20 of the cavity half 14 of the mold. This pressing step may be particularly useful if it is necessary to squeeze out the air from between the insert and the mold inner surface 20. The more complicated or irregular the surface or shape of the mold inside surface 20, the more advantageous it will be for the guide block to be able to press the insert against the mold surface.

As shown in FIG. 4, the guide block is mounted from insert vertical bars 48 using brackets 72 and block mounting members 74. In one embodiment of the invention, the block mounting members 74 are configured with springs, not shown, so that the guide block 68 is resiliently mounted, thereby damping the effects of the impact between the end of arm tooling 32 and the mold 10.

The insert transfer assembly 36 also includes a charger wand 78 having electrode pins 80 for receiving a voltage surge from a charger box, not shown, mounted on the robot. The charger box can be a remotely controlled electrostatic transformer. An electrical cord, also not shown, feeds the voltage to the charger wand 78. The charger wand receives the voltage surge and generates an electromagnetic field that transfers the insert 60 onto the inside surface 20 of the cavity half 14 of the mold 10 after the insert transfer member 42 and the insert 60 are moved into the desired location with respect to the mold. The insert 60 responds to the electromagnetic field by clinging to the mold 10, which acts as a ground. The charger wand 78 and the charger itself can be any device that produces the appropriate field to propel the insert 60 onto the mold surface 20. A preferred charger is a 25 kVolt charger available from Tantec. This charger produces about 10,000 volts, but at a low amperage. A preferred static charging bar is a C series bar from Tantec. Such chargers are also available from Simco. It is important that the guide block be non-conductive so that the film and charger will not ground out on the end of arm tooling 32.

The insert 60 applied by the apparatus and method of this invention can be a film that replaces paper or plastic labels. If the insert is a film, the film typically consists of several layers that include coatings, print, color and a microporous backing sheet. During molding, the moldable plastic material flows into the porous backing sheet to create a permanent bond between the plastic material and the film. Preferably, the film is coated with a heat resistant material, such as silicon or a polyurethane to withstand high temperatures usually present in the molding process. Another advantage of using the film is that upon cooling of the molded article the film will have a tendency to shrink, thereby eliminating ripples on the surface.

Graphic films for use with the invention can be obtained by Bayer-Tekra, Pinnacle Products, and Avery Dennison. Specialized coatings on the insert may be desirable for heat resistance and bonding between the insert and various plastic materials used in the mold. The film is preferably designed to adhere to such moldable plastic materials as ABS, nylon, PC, polyethylene, polypropylene and PVC.

Advantages of the invention include reducing cycle time, insuring accuracy and precision, both by the use of docking pins or other positioning devices and by enabling the use of electrostatic force to get the insert to adhere to the mold and thereby avoid unwanted movement of the insert once it is placed in the mold. The invention also insures accurate film registration within the mold, eliminates operator involvement, and enables placement of inserts in positions not attainable or very difficult for placement by an operator. Consequently, the complexity of the surface of the molded article 16 can be increased.

In operation, the molding cycle includes separating the mold halves 12, 14 and inserting the end of arm tooling 32 into the space 28 between the core half 12 and cavity half 14. The insert transfer assembly 36 is manipulated into place so that the insert 60 is positioned at the desired location for transfer. A charge is given to the charger wand 78, the vacuum on vacuum cups 52 is released, and the insert is transferred to the inside surface 20 of the cavity half 14. It is to be understood that the charge can be applied to the insert to cause the insert to move from the insert holder to the mold, or can be applied to merely hold the insert on the surface of the mold. In either case, the electric field causes the insert to adhere to the surface of the mold. The article removal assembly 34 is then manipulated into position adjacent the finished molded article 16, and the article is gripped by the vacuum applied through vacuum cups 52. The end of arm tooling is then removed from the mold, the finished article is removed from the end of arm tooling, and another insert is applied to the insert transfer assembly 36 for the next cycle. The mold is closed, the mold is charged, and another cycle begins.

The operation and structure described above uses a changing wand 78 that is mounted within the insert transfer assembly 36, and this is described as taking place while the end of arm tooling is within the mold. The insert holder can be positioned the insert in contact with the surface of the mold prior to the step of generating the electric field. In a different embodiment of the invention, however, the charging of the insert 60 occurs earlier and at a location outside the mold. The charger of this different embodiment is connected to a charging element, such as an exterior wand, not shown, that is positioned outside the mold. During operation of the apparatus and method of this embodiment, the step of generating the electric field occurs prior to the introduction of the insert into the mold. The insert holder and insert 60 are moved through the electric field generated by the external wand to charge the insert prior to the introduction of the insert into the mold. The end of arm tooling grips the insert with a vacuum during the step of introducing the insert into the mold. The insert holder then positions the insert in contact with the surface of the mold. Then the vacuum is removed, thereby releasing the grip of the insert holder on the insert.

Figure 7:
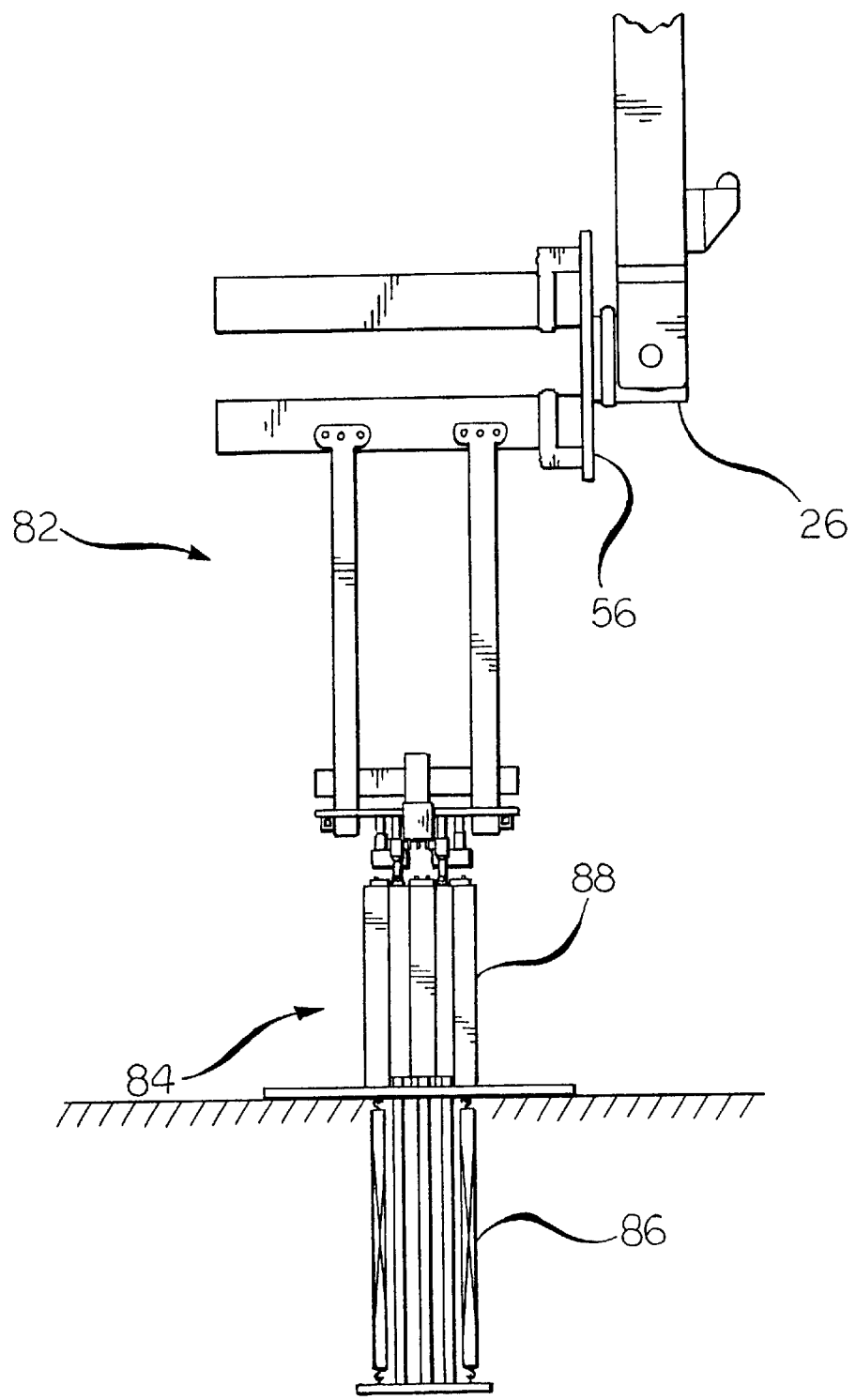
FIG. 7 is a schematic elevational view of a different end of arm tooling mechanism of the invention, illustrating the insert transfer assembly positioned to load an insert from an insert magazine feeder located outside the mold.
Figure 8:
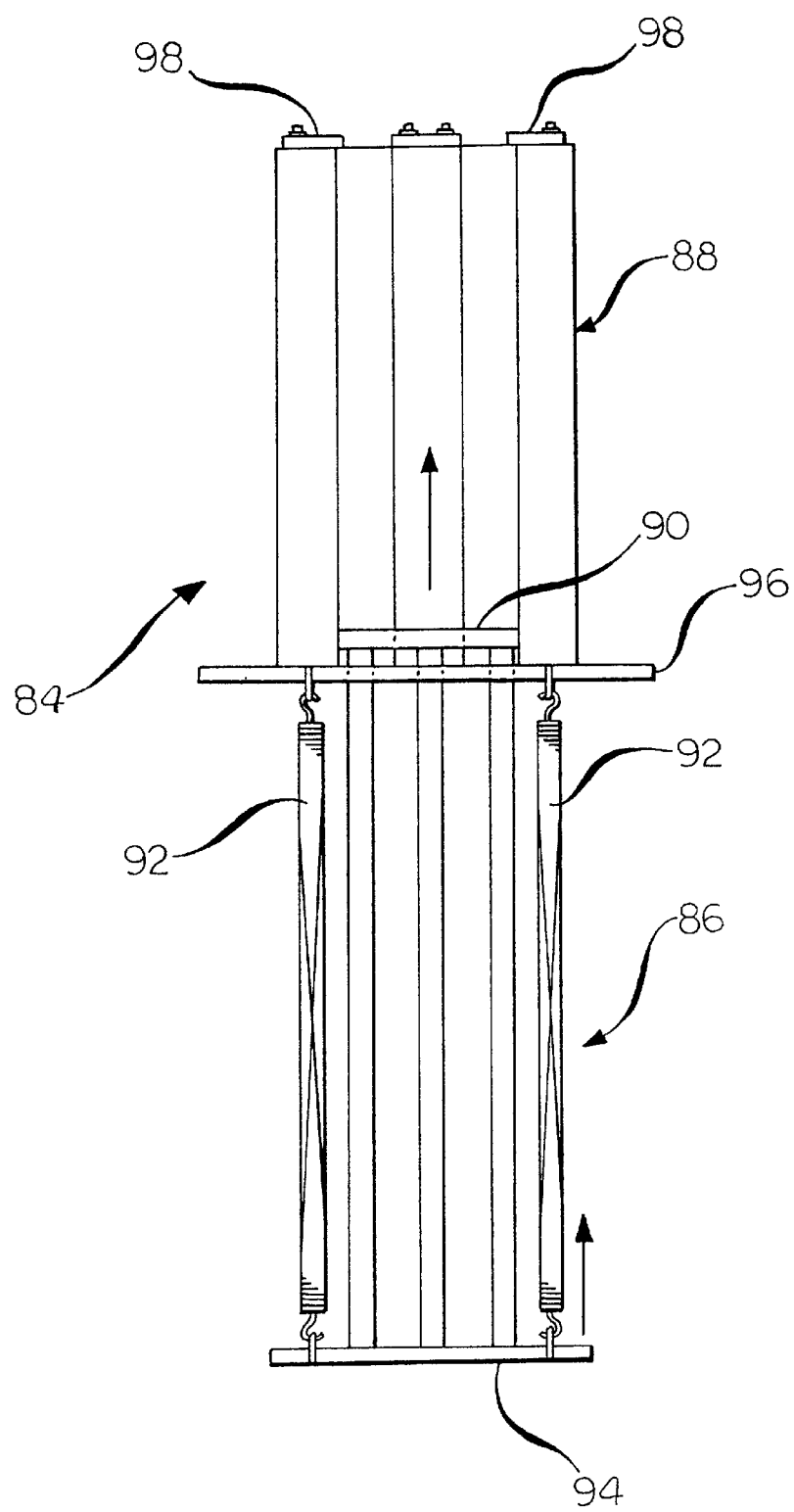
FIG. 8 is a more detailed elevational view of the magazine feeder of FIG. 7.

As shown in FIGS. 7 and 8, a holding and dispensing fixture, such as magazine feeder 84 can be used for supplying the inserts 60, not shown in FIG. 7, to another embodiment of end of arm tooling 82. The magazine feeder 84 is comprised of a base 86, a feeder housing 88 and a feeder plate 90 mounted for vertical movement within the feeder housing 88. Springs 92 positioned within the base 86 urge the bottom plate 94, which is rigidly connected to the feeder plate 90, upward with respect to the framework 96, in a manner similar to the plate feeders used in a salad bar line. A stack of inserts 60, not shown in FIGS. 7 or 8, rests on the feeder plate 90. At the top of the feeder housing 88 a series of retainer clips 98 holds the topmost insert 60 in the stack from being pushed out of the stack by the upwardly urged feeder plate 90. When the end of arm tooling 82 is manipulated to be adjacent the magazine feeder 84, in position for picking up the top most insert in the stack, the vacuum cups (insert holders) of the end of arm tooling 82 are activated with a vacuum, and the top insert is picked up. The retainer clips 98 hold the remaining inserts in the stack, and permit only one insert to be taken at a time. In summary, the magazine feeder 84 is a fixture that contains a plurality of inserts in a stack formation so that the insert transfer member (assembly) of the end of arm tooling 82 can pick up inserts for insertion in the mold.

Figure 9:
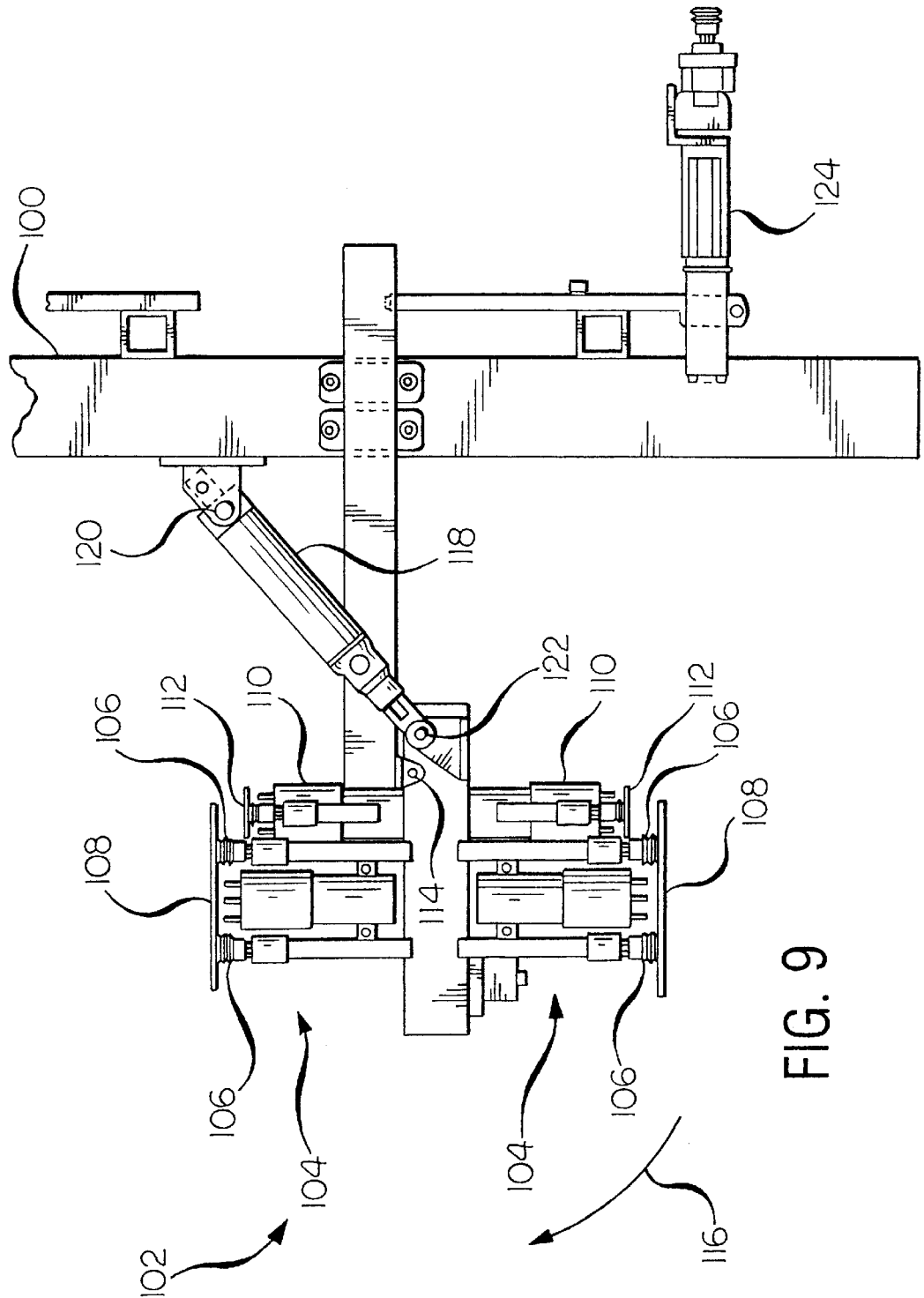
FIG. 9 is a schematic plan view of a different end of arm tooling capable of applying several different inserts into a mold cavity during each molding cycle.

As shown in FIG. 9, the end of arm tooling of the invention can be provided with a more sophisticated insert transfer assembly by including multiple insert holders and allowing several inserts to be picked up and placed at various places in the mold. An end of arm tooling frame 100 is mounted on a robot arm, not shown. Connected to the end of arm tooling frame 100 is the end of arm tooling 102, which includes two insert transfer assemblies 104, one facing upwardly (as viewed in FIG. 9) and the other facing downwardly. It is to be understood that any number of insert transfer assemblies can be used. The insert transfer assemblies 104 are provided with vacuum cups 106 for gripping the inserts, which are indicated at 108. The insert transfer assemblies 104 also include a secondary insert transfer member 110 that is capable of gripping smaller inserts 112.

In order for the insert transfer assembly 104 to be able to pick up the inserts, or to be able to drop off the inserts at the appropriate place on the inside of the mold, the insert transfer assemblies must be mounted for a rotative or swivel motion. The rotation mechanism is shown for the downwardly facing insert transfer assembly 104, while the corresponding mechanism for the upwardly facing insert transfer assembly is not shown, for purposes of clarity. The downwardly facing insert transfer assembly is mounted on pivot pin 114 for rotation in the direction of directional arrow 116. A pneumatic piston 118 is mounted between stationary anchoring point 120 and an anchoring point 122 on the rotatable insert transfer assembly 104. When the piston 118 is actuated, the anchoring point 122 is moved away from the stationary anchoring point 120 and the downwardly facing insert transfer assembly is rotated. If the insert transfer assembly is rotated 90 degrees, the insert transfer assembly will face the left, as viewed in FIG. 9. An article removal assembly 124, which can be similar to the article removal assembly 34 illustrated in FIGS. 1–3, is shown.

Figure 10:
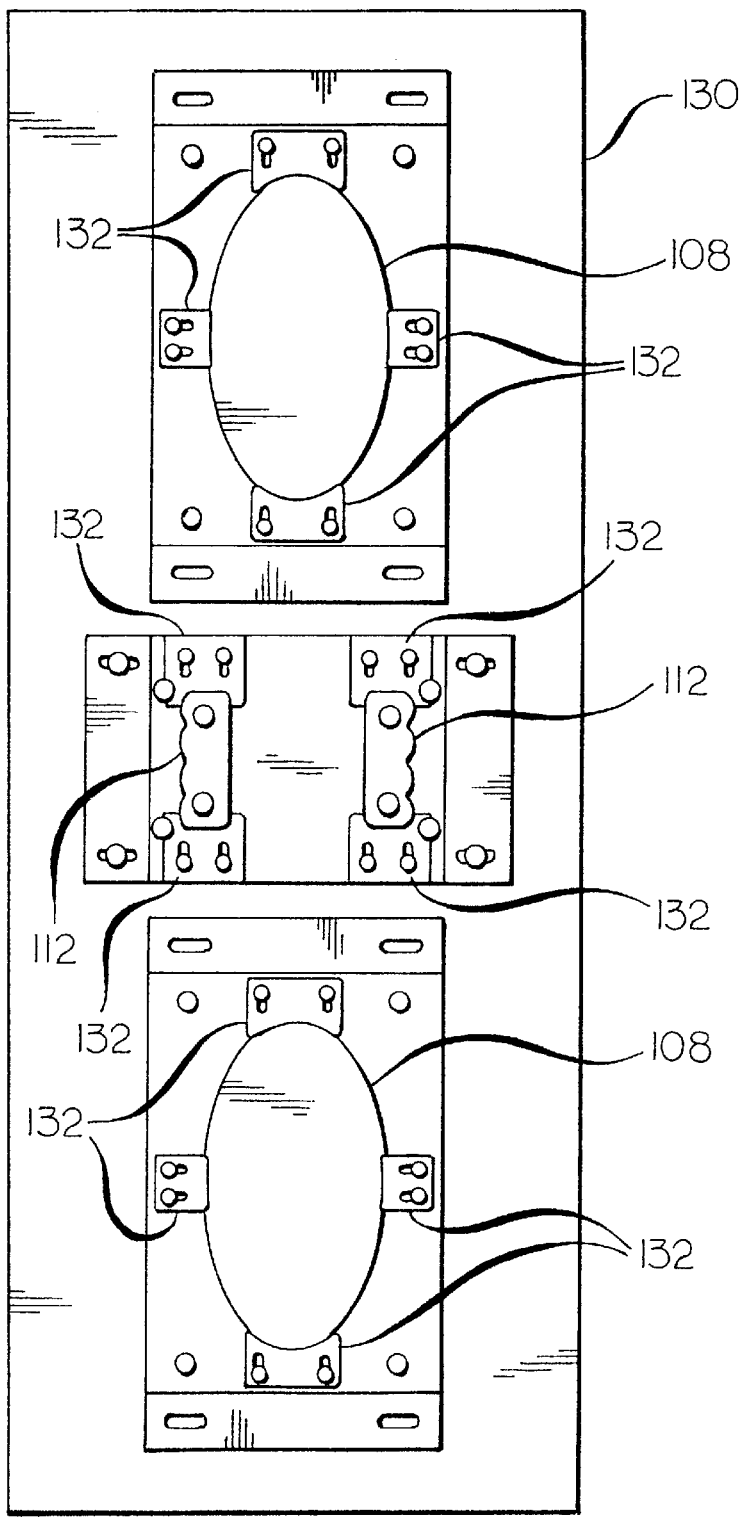
FIG. 10 is a schematic plan view of several stacks of inserts in a magazine feeder, with the inserts ready to be picked up by the end of arm tooling shown in FIG. 9.

As shown in FIG. 10, a magazine feeder 130 includes stacks of inserts 108 and 112. The inserts 108, 112 in each stack are held in place by clips 132, similar to the clips 98 shown in FIG. 8, so that when the topmost insert is grabbed by the suction cups of the insert transfer assembly 104, the remainder of the inserts will remain in place.

Although the insert transfer assemblies 36 and 104 illustrated and described in this specification all include vacuum cups connected to a source of vacuum, it is to be understood that other means for grasping the inserts and holding them until they are transferred to the appropriate location on the mold surface can be employed. For example, where the insert is metallic or capable of being magnetized, a magnetic grasping means or attachment can be used. Also, a static electricity attachment means can be used.

The principle and mode of operation of this invention have been described in its preferred embodiments. However, it should be noted that this invention may be practiced otherwise than as specifically illustrated and described without departing from its scope.

What is claimed is:

1. Apparatus for molding articles from moldable material in a mold comprising:
    a. end of arm tooling for an articulated robot arm associated with the mold, the end of arm tooling comprising an insert transfer member mounted on the end of the articulated robot arm, the insert transfer member having a framework and an insert holder for gripping the insert, the insert holder being configured to be adjustable with respect to the framework; and
    b. a charger for generating an electric field that causes the insert to adhere to a surface of the mold.

2. The apparatus of claim 1 in which the insert holder is a vacuum-assisted insert holder supplied with a source of vacuum for gripping the insert.

3. The apparatus of claim 2 in which the insert holder includes suction cups for applying a vacuum to the insert.

4. The apparatus of claim 1 including an article removal assembly mounted on the end of arm tooling for removing molded articles from the mold.

5. The apparatus of claim 1 in combination with a fixture that contains a plurality of inserts in a stack formation so that the insert transfer member can pickup inserts for insertion in the mold.

6. The apparatus of claim 1 in which the charger is an electrostatic transformer.

7. The apparatus of claim 1 in which the insert transfer member is adapted to pick up at least two inserts for placement on different locations on the mold.

8. The apparatus of claim 1 in which the charger includes a wand that is positioned on the end of arm tooling.

9. The apparatus of claim 1 in which the charger includes a wand that is positioned outside the mold.

10. Apparatus for molding articles from moldable material in a mold comprising:
    a. end of arm tooling for an articulated robot arm associated with the mold, the end of arm tooling comprising an insert transfer member mounted on the end of the articulated robot arm, the insert transfer member having a framework and a vacuum-assisted insert holder supplied with a source of vacuum for gripping the insert, the insert holder being configured to be adjustable with respect to the framework; and
    b. a charger for generating an electric field that causes the insert to adhere to a surface of the mold, the charger including a wand that is positioned outside the mold.

11. The apparatus of claim 10 in which the insert holder includes suction cups for applying a vacuum to the insert, and further including an article removal assembly mounted on the end of arm tooling for removing molded articles from the mold.

12. The method of molding articles from moldable material comprising:
    opening a mold having a mold cavity;
    introducing end of arm tooling on a robot arm into the mold cavity, wherein the end of arm tooling is gripping an insert;
    generating an electric field that causes the insert to adhere to a surface of the mold;
    removing the end of arm tooling from the mold; and
    charging and closing the mold for molding;
    wherein the end of arm tooling comprises an insert transfer member mounted on the end of the articulated robot arm, the insert transfer member having a framework and an insert holder for gripping the insert, the insert holder being configured to be adjustable with respect to the framework.

13. The method of claim 12 in which the insert holder positions the insert in contact with the surface of the mold prior to the step of generating the electric field.

14. The method of claim 12 in which the step of generating the electric field occurs prior to the introduction of the insert into the mold.

15. The method of claim 14 in which the insert holder and insert are moved through the electric field to charge the insert prior to the introduction of the insert into the mold.

16. The method of claim 15 in which the end of arm tooling grips the insert with a vacuum during the step of introducing the insert into the mold, the insert holder then positions the insert in contact with the surface of the mold, and then the vacuum is removed, thereby releasing the grip of the insert holder on the insert.

17. The method of molding articles of claim 12 including applying a vacuum to the insert with suction cups to grip the insert.

18. The method of molding articles of claim 12 in which the step of removing the end of arm tooling from the mold includes removing a molded article molded in a previous mold cycle from the mold.

19. The method of molding articles of claim 12 in which the insert transfer member picks up inserts from a stack of inserts in a fixture for insertion into the mold.

20. The method of molding articles of claim 12 including picking up at least two inserts for placement on different locations on the mold.

* * * * *